United States Patent Office 3,847,879
Patented Nov. 12, 1974

3,847,879
N-(THIO)DIAMIDES
Kamel Boustany and John P. Vander Kooi, Akron, Ohio, assignors to Monsanto Company, St. Louis, Mo.
No Drawing. Original application July 30, 1970, Ser. No. 59,719. Divided and this application Nov. 2, 1972, Ser. No. 303,131
Int. Cl. C08c 11/54; C08d 9/00; C08f 27/06
U.S. Cl. 260—79.5 B      10 Claims

ABSTRACT OF THE DISCLOSURE

Diamides of the formula

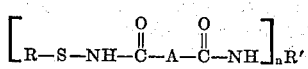

where R, A and R' are hydrocarbon radicals, are prepared by reacting a primary amine or diamine with N-thioimide. The diamides are inhibitors of premature vulcanization.

---

This is a division, of application Ser. No. 59,719, filed July 30, 1970 now U.S. Pat. 3,732,271 issued May 8, 1973.

This invention relates to N-(thio)diamides, to methods for preparing them and to methods for inhibiting premature vulcanization.

SUMMARY OF THE INVENTION

We have discovered a new class of compounds which are N-thiodiamides. It was found that thioimides react with primary unhindered aliphatic amines to give ring opened unsymmetrical N-thiodiamides of the formula

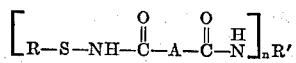

where R is alkyl, aryl, aralkyl, alkaryl or cycloalkyl; n is one or two depending upon the valence of R' and R' is primary alkyl, secondary alkyl, cycloalkyl, aralkyl, alkenyl or alkylene and A is alkylene, alkenylene or arylene. In the reaction of N-thiocycloimides with certain primary amines, the cycloimide ruptures forming N-thiodiamide according to the following equation:

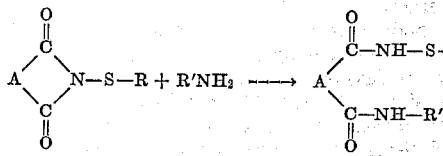

A is a divalent alkylene, alkenylene or arylene radical of 2 to 10 carbon atoms wherein the bonds of the two carbonyl groups are attached to two different carbon atoms. Examples of A are dimethylene, trimethylene, tetramethylene, pentamethylene, hexamethylene, vinylene, cyclohexylene, cyclohexenylene, phenylene, preferably ortho phenylene, and naphthylene.

Alkyl is a monovalent radical derived by removal of one hydrogen atom from an acyclic aliphatic hydrocarbon. Branched or unbranched alkyl radicals of 1 to 20 carbon atoms are suitable for R. Aryl is a monovalent radical derived by removal of one hydrogen atom from an aromatic hydrocarbon. Phenyl is the preferred aryl radical but radicals of the naphthalene series are suitable. Cycloalkyl is a monovalent radical derived by removal of one hydrogen atom from a cyclic aliphatic hydrocarbon. Cycloalkyl radicals of 5 to 12 carbon atoms are suitable for either R or R' with cycloalkyl of 5 to 8 carbon atoms preferred. Alkaryl is a monovalent aryl radical substituted in the carbocyclic nucleus with an alkyl radical. Aralkyl is a monovalent alkyl radical having an aryl radical attached to a carbon atom of the alkyl chain. Alkenyl is a monovalent radical derived by removal of one hydrogen atom from an unsaturated hydrocarbon of 1 to 6 carbon atoms of the $C_nH_{2n}$ series. Alkylene, alkenylene and arylene are divalent radicals wherein the bonds are attached to two different carbon atoms which are derived by removal of two hydrogen atoms from alkyl, alkenyl and aryl, respectively.

R is a monovalent radical, examples of which are methyl, ethyl, propyl, isopropyl, butyl, isobutyl, sec.-butyl, tert-butyl, amyl, hexyl, octyl, decyl, dodecyl, cetyl, eicosyl, cyclopentyl, cyclohexyl, cyclooctyl, cyclododecyl, benzyl, alpha - methyl benzyl, alpha, alpha - dimethyl benzyl, phenyl, tolyl, 4-ethyl phenyl and naphthyl.

R' is mono or divalent and, as noted above, is derived from a primary monoamine or diamine reactant. R' may contain 1 to 20 carbon atoms. Examples of R' are methyl, ethyl, n-propyl, isopropyl, n-butyl, isobutyl, sec.-butyl, n-amyl, isoamyl, 1-methylbutyl, n-hexyl, n-octyl, n-decyl, n-dodecyl, n-tetradecyl, cetyl n-octadecyl, eicosyl, cyclopentyl, cyclohexyl, cyclooctyl, cyclodecyl, benzyl, alpha-methyl benzyl, vinyl, allyl, 2-butenyl, 3-butenyl, 1-propenyl, hexenyl, dimethylene, trimethylene, tetramethylene, pentamethylene, hexamethylene, octamethylene, decamethylene, dodecamethylene and hexadecamethylene.

The compounds of this invention are excellent premature vulcanization inhibitors which enhance the processing safety of vulcanizable rubber compositions. They are particularly useful when used in combination with sulfenamide accelerators; and prevent scorch of rubber stocks containing scorchy amine antidegradants. In addition to increasing processing safety, the inhibitors of this invention also activate the vulcanization process which means that stocks containing the inhibitors cure faster than stocks containing conventional inhibitors.

The inhibitors are effective with sulfur-vulcanizable elastomers such as natural rubber, synthetic rubber or mixtures thereof. Suitable synthetic rubbers are styrene-butadiene copolymer, isobutylene-isoprene copolymer, ethylene-propylene diene terpolymers, butadiene-acrylonitrile copolymer, polymers of chloroprene and synthetic polyisoprene.

Rubber stocks containing sulfur and sulfur-vulcanizing agents are improved by incorporating the inhibitors of this invention. The inhibitors are active with dithiocarbamate, thiuram monosulfide, thiuram disulfide and thiazole disulfide accelerators. Stocks containing accelerator systems using amine activators are also improved.

The amount of inhibitor required depends upon the composition of the stock but generally is between 0.1 to 5.0 parts of inhibitor per 100 parts rubber. More often the quantity of inhibitor used will be from 0.5 to 1.5 parts of inhibitor per 100 parts rubber.

DESCRIPTION OF PREFERRED EMBODIMENTS

The compounds of this invention are conveniently prepared by contacting a primary amine or diamine with N-thioimide at moderate temperature and separating the products by conventional techniques. The products are recovered substantially pure in good yields.

EXAMPLE 1

To a stirred solution of N-cyclohexylthio phthalimide (26.2 grams, 0.1 mole in 200 ml. of benzene) is added 10.1 grams (0.1 mole) of n-hexylamine at room temperature. After 15 minutes the mixture is filtered to recover a white solid which is washed with benzene and allowed to dry. The product weighs 27.0 grams and melts at 111–112° C. An additional four grams of product is recovered by concentration of the benzene solution. The product is soluble in ethanol. Analysis of the N-(cyclohexylthio)-N'-hexylphthalamide gives 66.85% C, 8.23% H, 7.46% N and 8.32% S compared to 66.26% C, 8.34% H, 7.73% N and 8.84% S calculated for $C_{20}H_{30}N_2O_2S$. The identification is confirmed by nuclear magnetic resonance spectral analysis.

EXAMPLE 2

N-butyl-N'-(cyclohexylthio)phthalamide is prepared by adding N-cyclohexylthio phthalimide (12 grams, 0.5 mole) in 75 ml. of cold benzene to n-butylamine (32 grams, 0.4 mole) at 0° C. Gas-liquid-chromatographic analysis of the mixture five minutes after combining the reactants indicates that nearly all the N-cyclohexylthio phthalimide is reacted. Evaporation of the reaction mixture on a rotary vacuum evaporator gives a yellow oil which precipitates a white solid upon addition of heptane. 12 Grams of the desired product is recovered by filtration. The N-butyl-N'-(cyclohexylthio)phthalamide melts at 110–112° C.; analysis gives 65.02% C, 7.50% H, 8.89% N and 8.35% S compared to 64.67% C, 7.78% H, 8.38 N and 9.58% S calculated for $C_{18}H_{26}N_2O_2S$.

EXAMPLE 3 n-Butylamine is added at room temperature to 25 grams of purified N-cyclooctylthio phthalimide dissolved in benzene. The mixture is allowed to stand for several hours and 23 grams of product, a cream color solid, is recovered by filtration. The solid is rinsed with benzene and dried at room temperature. The N-butyl-N'-(cyclooctylthio)phthalamide melts at 95–97° C. Analysis gives 66.03% C, 7.99% H, 7.65% N and 8.56% S compared to 66.26% C, 8.34% H, 7.73% N and 8.84% S calculated for $C_{20}H_{30}N_2O_2S$.

EXAMPLE 4

N-Cyclohexylthio phthalimide (6.25 g.) and isopropylamine (2.0 g.) are mixed in benzene at 0° C. Formation of precipitate is complete after two hours. The mixture is allowed to stand overnight. A white solid is recovered by filtering the mixture. The solid is dissolved in ethanol and the solution slowly evaporated until a solid forms; 0.7 gram of phthalimide, m.p. 235° C., is separated by filtering. The remainder of solvent is evaporated to give 4.75 grams of N - (cyclohexylthio)-N'-isopropylphthalamide which melts at 98–102° C. Analysis gives 64.56% C, 7.66% H and 8.32% N compared to 63.6% C, 7.5% H and 8.75% N calculated for $C_{17}H_{24}N_2O_2S$.

EXAMPLE 5

5 Grams of methylamine is bubbled into a solution containing 25 grams of N-cyclohexylthio phthalimide in 300 ml. of benzene at 25° C. 23 Grams of N-(cyclohexylthio)-N'-methylphthalamide which melts at 137–138° C. is recovered by filtering the mixture. Analysis gives 61.77% C, 6.84% H, 9.57% N and 10.75% S compared to 62.6% C, 7.0% C, 7.0% H, 9.57% N and 10.95% S calculated for $C_{15}H_{20}N_2O_2S$.

EXAMPLE 6

This example illustrates the preparation of bis compounds. To a solution of 26.0 grams (0.1 mole) of N-cyclohexylthio phthalimide in 300 ml. of benzene is added at room temperature a solution of 5.8 grams (0.05 mole) of 1,6-hexanediamine in 100 ml. of benzene. The mixture is stirred for 1¼ hours after which a white solid is recovered by filtration, washed with benzene and dried. 25 Grams of N,N'-di(cyclohexylthio)-N'',N'''-hexamethylenediphthalamide which melts at 111–113° C. is rocevered. Analysis gives 64.80% C, 7.31% H, 8.56% N and 9.61% S compared to 63.91% C, 7.25%% H, 8.77% N and 10.03% S calculated for $C_{34}H_{46}N_4O_4O_2$.

EXAMPLE 7

Allylamine (11.4 g., 0.2 mole) in 50 ml. of benzene is added dropwise in 45 minutes to N-cyclohexylthio phthalimide in 350 ml. of benzene at 20° C. A white precipitate forms immediately. The mixture is stirred for 30 minutes. The product, a white solid, is recovered by filtration, washed with cold benzene and dried. 48.0 Grams of N-allyl-N'-(cyclohexylthio)phthalamide which melts at 117° C. is obtained. Identification is confirmed by Infrared spectral analysis.

EXAMPLE 8

10 Grams of benzylamine is added with stirring to 25 grams of N-cyclohexylthio phthalimide in 100 ml. of benzene at room temperature. A white precipitate forms in about 15 minutes. The mixture is allowed to stand an additional ½ hour before recovering the product by filtration. 31 Grams of N-benzyl-N'-(cyclohexylthio)phthalamide which melts at 165–170° C. is obtained.

EXAMPLE 9

10 Grams of cyclohexylamine is reacted with 25 grams of N-cyclohexylthio phthalimide following the procedure of Example 8 to give 29 grams of N-cyclohexyl-N'-(cyclohexylthio)phthalamide which melts at 134–135° C. Analysis gives 67.63%% C, 7.63%% H, 7.97% N and 8.03% S compared to 66.7% C, 7.76% H, 7.76% N and 8.85% S calculated for $C_{20}H_{28}N_2O_2S$.

EXAMPLE 10

Benzylamine (1.07 g., 01 mole) is added to a solution of N-(tert-butylthio)phthalimide( 2.35 g., 01 mole) in 100 ml. of benzene at room temperature and the mixture allowed to stand overnight. The solvent is evaporated at room temperature to give 3.3 grams of N-benzyl-N'-(tert-butylthio)phthalamide, m.p. 155–6° C. The identification is confirmed by nuclear magnetic spectral analysis.

EXAMPLE 11

N-Octadecyl-N'-(phenylthio)phthalamide is preferred at room temperature by mixing 2.55 grams of N-phenylthio phthalimide dissolved in about 50 ml. of benzene with 2.69 grams of octadecylamine (stearamide) in 50 ml. of benzene. A pale precipitate forms after about 5 minutes. 2.3 Grams of the N-octadecyl-N'-(phenylthio) phthalamide, m.p. 85–90° C., is recovered by filtration. More product is obtained upon further evaporation of the benzene filtrate. Identification of the product is confirmed by nuclear magnetic resonance spectral analysis.

EXAMPLE 12

Benzylamine (1.1 g., 0.01 mole) is added to N-cyclohexylthio maleimide (2.1 g., 0.01 mole) in about 75 ml. of benzene at room temperature. The mixture is allowed to stand three days and a precipitate, which slowly formed, is recovered by filtration. The precipitate is washed with 50 ml. of benzene and dried at room temperature. 0.3 Grams of N-benzyl-N'-(cyclohexylthio)maleamide which melts above 200° C. with decomposition is obtained. Identification is confirmed by nuclear magnetic resonance spectral analysis.

EXAMPLE 13

N-Cyclohexylthio succinimide (5.0 g.) and n-hexylamine (2.4 g.) are mixed at room temperature with a mortar and pestle. The mixture is slurried in hexane and filtered to give a white solid, m.p. 11–115° C. Analyses indicate the presence of succinimide. The mixture is washed with water to remove the succinimide to yield substantially pure N-(cyclohexylthio)-N'-(n-hexyl)succinamide, m.p. 123–124° C.

EXAMPLE 14

Benzylamine (1.07 g.) is added to a benzene solution containing N-cyclohexylthio succinimide (2.1 g.) at room temperature and the mixture is allowed to stand overnight. The benzene is removed by evaporation and the residue is washed consecutively with heptane, water and methanol. 0.4 Grams of substantially pure N-benzyl-N'-(cyclohexylthio)succinamide, m.p. 190–191° C., is recovered.

To illustrate the premature vulcanization inhibitor properties of the compounds of this invention, a natural rubber masterbatch is compounded as follows:

| | Parts by weight |
|---|---|
| Smoked sheets | 100 |
| I.S.A.F. carbon black | 45 |
| Zinc oxide | 3 |
| Stearic acid | 2 |
| Hydrocarbon softener | 5 |
| Total | 155 |

To 155 parts of the masterbatch is mixed 2.2 parts sulfur, 0.5 part accelerator, N-*tert*-butyl-2-benzothiazolesulfenamide and the stated parts of the inhibitors of this invention. The processing safety of the stocks is determined by means of a Mooney plastometer. The time in minutes ($t_5$) required for the Mooney reading to rise five points above the minimum viscosity is recorded. Longer times on the Mooney Scorch test are desirable since they indicate greater activity of the inhibitor. The cure characteristics of the stocks are determined by a Monsanto Oscillating Disk Rheometer at 144° C. where $t_2$ is the time in minutes required for the rise of two Rheometer units above the minimum viscosity and $t_{90}$ is the time in minutes required to obtain 90% of the maximum Rheometer torque. The difference ($t_{90}-t_2$) is indicative of the cure rate of the stock. Small values of $t_{90}-t_2$ indicate faster cure times. Vulcanizates are prepared by press curing the stocks at 144° C. for 35 minutes and the physical properties of the vulcanizates are recorded. The results are shown in Table I. Stock A is identical to the other stocks except no inhibitor is added

TABLE I

| | Stocks | | | |
|---|---|---|---|---|
| | A | B | C | D |
| Inhibitor: | | | | |
| N-(cyclohexylthio)-N'-hexyl-phthalamide | | 0.5 | | |
| N,N'-di(cyclohexylthio)-N'',N'''-hexamethylenediphthalamide | | | 0.5 | |
| N-allyl-N'-(cyclohexylthio)phthalamide | | | | 0.5 |
| Mooney scorch at 121° C.: | | | | |
| $t_5$ | 32.3 | 46.4 | 47.9 | 51.2 |
| Percent increase in scorch delay | | 44 | 48 | 58 |
| Rheometer at 144° C.: | | | | |
| $t_2$ | 7.2 | 9.8 | 9.6 | 10.7 |
| $t_{90}-t_2$ | 13.5 | 12.3 | 13.1 | 13.5 |
| 300% modulus, p.s.i. | 1,740 | 1,860 | 1,860 | 1,800 |
| Ultimate tensile strength, p.s.i. | 3,840 | 3,990 | 3,900 | 4,000 |

A twelve percent increase in scorch delay is obtained in a similar stock containing 0.17 parts of N-benzyl-N'-(cyclohexylthio)-maleamide.

The data in Table II illustrate the scorch inhibition of stocks containing antidegradant. The stocks are cured at 144° C. for 30 minutes except Stock F which is cured for 25 minutes.

TABLE II

| | Stocks | | | |
|---|---|---|---|---|
| | E | F | G | H |
| Ingredients, parts by weight: | | | | |
| Natural rubber masterbatch | 155 | 155 | 155 | 155 |
| Sulfur | 2.0 | 2.0 | 2.0 | 2.0 |
| N-*tert*-butyl-2-benzothiazolesulfenamide | 0.5 | 0.5 | 0.5 | 0.5 |
| N-1,3-dimethylbutyl-N'-phenyl-*p*-phenylenediamine | 2.0 | 2.0 | 2.0 | 2.0 |
| N-butyl-N'-(cyclooctylthio)phthalamide | | 1.0 | | |
| N-(cyclohexylthio)-N'-isopropyl-phthalamide | | | 1.0 | |
| N-(cyclohexylthio)-N'-methyl-phthalamide | | | | 1.0 |
| Mooney scorch at 121° C.: | | | | |
| $t_5$ | 27.4 | 34.4 | 53.3 | 43.4 |
| Percent increase in scorch delay | | 26 | 94 | 58 |
| Rheometer at 144° C.: | | | | |
| $t_2$ | 7.5 | 8.0 | 10.5 | 9.5 |
| $t_{90}-t_2$ | 12.5 | 10.0 | 11.5 | 11.5 |
| 300% modulus, p.s.i. | 1,460 | 1,500 | 1,500 | 1,600 |
| Ultimate tensile strength, p.s.i. | 3,760 | 3,950 | 3,940 | 4,000 |

Tests in a similar stock containing 2.2 parts sulfur and comparison of the scorch time with that obtained by addition of inhibitor gives the following results: Addition of 0.5 parts of N-*n*-octyl-N'-(cyclohexylthio)succinamide increases the scorch delay 21%; addition of one part of N-octadecyl - N' - (phenylthio)phthalamide increases the scorch delay 26%; and addition of 0.3 parts of N-benzyl-N'-(cyclohexylthio)succinamide increases the scorch delay 42%.

The data in Table III illustrate the prevulcanization inhibitor activity of the compounds of this invention used in a synthetic rubber stock accelerated with 2,2'-dibenzothiazyl disulfide (MBTS). The data illustrate also how the compounds activate the cure rate. Note Stock J containing the compound of this invention has greater processing safety, yet cures faster ($t_{90}-t_2$) than the control Stock I.

TABLE III

| | Stocks | |
|---|---|---|
| | I | J |
| Ingredients, parts by weight: | | |
| Oil-extended styrene-butadiene copolymer rubber | 137.5 | 137.5 |
| I.S.A.F. carbon black | 65.0 | 65.0 |
| Zinc oxide | 3.0 | 3.0 |
| Stearic acid | 1.0 | 1.0 |
| Hydrocarbon softener | 1.5 | 1.5 |
| N-1,3-dimethylbutyl-N'-phenyl-*p*-phenlyenediamine | 2.0 | 2.0 |
| Sulfur | 2.2 | 2.2 |
| MBTS | 1.2 | 1.2 |
| N,N'-di(cyclohexylthio)-N'',N'''-hexamethylene-phthalamide | | 1.0 |
| Mooney scorch at 121° C.: Percent increase in scorch delay | | 40 |
| Mooney scorch at 135° C.: Percent increase in scorch delay | | 39 |
| Rheometer at 153° C.: | | |
| $t_2$ | 7.3 | 8.6 |
| $t_{90}$ | 31.3 | 25.5 |
| $t_{90}-t_2$ | 24.0 | 16.9 |
| 300% modulus, p.s.i. | 1,220 | 1,030 |
| Ultimate tensile strength, p.s.i. | 2,910 | 2,350 |

One part of N-benzyl-N'-(cyclohexylthio)phthalamide as prevulcanization inhibitor in a stock similar to Stock I of Table III but containing 1.8 parts sulfur and N-morpholinothiobenzothiazole as accelerator gives a 53% increase in scorch delay.

The data in Table IV illustrates the premature vulcanization inhibitor activity of other compounds of this invention and also illustrate the effect inhibitor concentration has on the scorch delay properties. The data demonstrate that desired scorch delay can be obtained by controlling the amount of inhibitor added to the rubber composition.

TABLE IV

| | Stocks | | | | | |
|---|---|---|---|---|---|---|
| | K | L | M | N | O | P |
| Ingredients, parts by weight: | | | | | | |
| Natural rubber masterbatch | 155 | 155 | 155 | 155 | 155 | 155 |
| Sulfur | 2.0 | 2.0 | 2.0 | 2.0 | 2.0 | 2.0 |
| N-*tert*-butyl-2-benzothiazolesulfenamide | 0.5 | 0.5 | 0.5 | 0.5 | 0.5 | 0.5 |
| N-1,3-dimethylbutyl-N'-phenyl-*p*-phenylenediamine | 2.0 | 2.0 | 2.0 | 2.0 | 2.0 | 2.0 |
| N-Butyl-N'-(cyclohexylthio)-phthalamide | 0.5 | | | | | |
| N-cyclohexyl-N'-(cyclohexylthio)-phthalamide | | 0.5 | | | | |
| N-benzyl-N'-(cyclohexylthio)-phthalamide | | | 0.25 | 0.5 | 1.0 | |
| Mooney scorch at 135° C.: | | | | | | |
| $t_5$ | 19.5 | 33.2 | 37.7 | 27.5 | 37.9 | 49.9 |
| Percent increase in scorch delay | | 70 | 93 | 41 | 94 | 175 |
| Rheometer at 144° C.: | | | | | | |
| $t_2$ | 6.7 | 9.4 | 10.5 | 8.5 | 10.5 | 12.2 |
| $t_{90}-t_2$ | 13.0 | 11.7 | 12.5 | 13.4 | 13.0 | 11.8 |
| Rheometer maximum torque | 54 | 56 | 57 | 55 | 55 | 57 |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A process for inhibiting premature vulcanization of a vulcanizable diene rubber containing sulfur or sulfur vulcanizing agent which comprises incorporating therein in an amount effective to inhibit premature vulcanization a compound of the formula

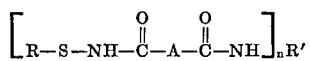

wherein R is alkyl, aryl, aralkyl, alkaryl or cycloalkyl; R' is primary alkyl, secondary alkyl, cycloalkyl, aralkyl or alkenyl when $n$ is one and alkylene when $n$ is two; A is alkylene, alkenylene or arylene.

2. A process according to Claim 1 wherein R is alkyl, aryl or cycloalkyl; R' is primary alkyl, secondary alkyl or cycloalkyl; A is ortho phenylene and $n$ is one.

3. A process according to Claim 2 wherein R is cyclohexyl.

4. A process according to Claim 3 wherein R' is hexyl.

5. A process according to Claim 3 wherein R' is cyclohexyl.

6. A process according to Claim 3 wherein R' is isopropyl.

7. A process according to Claim 1 wherein R is cyclohexyl, R' is allyl, A is ortho phenylene and $n$ is one.

8. A process according to Claim 1 wherein R is cyclohexyl, R' is benzyl, A is ortho phenylene and $n$ is one.

9. A process according to Claim 1 wherein R is alkyl, aryl or cycloalkyl; A is ortho phenylene and $n$ is two.

10 A process according to Claim 9 wherein R is cyclohexyl and R' is hexamethylene.

References Cited
UNITED STATES PATENTS 3,546,185  12/1970  Coran _____ 260—79.5

CHRISTOPHER A. HENDERSON, Primary Examiner

U.S. Cl. X.R.

260—79.5 P, 453 R, 780